July 29, 1969     L. J. THOMPSON     3,458,786
MOVABLE ELEMENT POSITIONING SYSTEM WITH
COARSE AND FINE INCREMENTAL CONTROL
Filed July 11, 1966     4 Sheets-Sheet 1

INVENTOR
LEON J. THOMPSON

BY *Owen L. Lamb*

AGENT

| | | | | | | | |
|---|---|---|---|---|---|---|---|
| POSITION ADDRESS | 0 | 6 | 6 | 6 | 6 | 6 | 6 |
| LOCATION REG | 0 | 1 | 2 | 3 | 4 | 5 | 6 |

NO MATCH 
SLEW COMPARE 
INHIBIT INCREMENT 
SS 1 
SS 2 
SS 3 
SS 4 
SS 5 
SS 6 
SLEW DAMP 
MOTOR STEP 
SAMPLE

REG 1 
REG 2 
REG 4 
REG 8 
ØA 1 
ØA 2 
ØB 1 
ØB 2 
ØA DAMP 
ØB DAMP

SS 7 
SS 8 
SS 9 
SS 10

D1 
D2 
D3 
D4

# United States Patent Office 3,458,786
Patented July 29, 1969

3,458,786
MOVABLE ELEMENT POSITIONING SYSTEM WITH COARSE AND FINE INCREMENTAL CONTROL
Leon J. Thompson, La Grange, N.Y., assignor to International Business Machines Corporation, Armonk, N.Y., a corporation of New York
Filed July 11, 1966, Ser. No. 564,354
Int. Cl. H02p 1/16
U.S. Cl. 318—18
4 Claims

ABSTRACT OF THE DISCLOSURE

A digitally controlled positioning system in which a movable element driven by a stepping motor is accurately positioned in response to an input command. The driving circuitry operates in one of two modes. In the first mode, the element is moved in large increments of a fixed number until the distance remaining to be moved is less than the fixed number. The circuitry then operates in a second mode to move the element one increment at a time until the element reaches the desired position. The circuitry is designed so that the motion in each mode of operation is optimized, that is, the element will move and come to a stop without oscillation.

---

Figure 1:
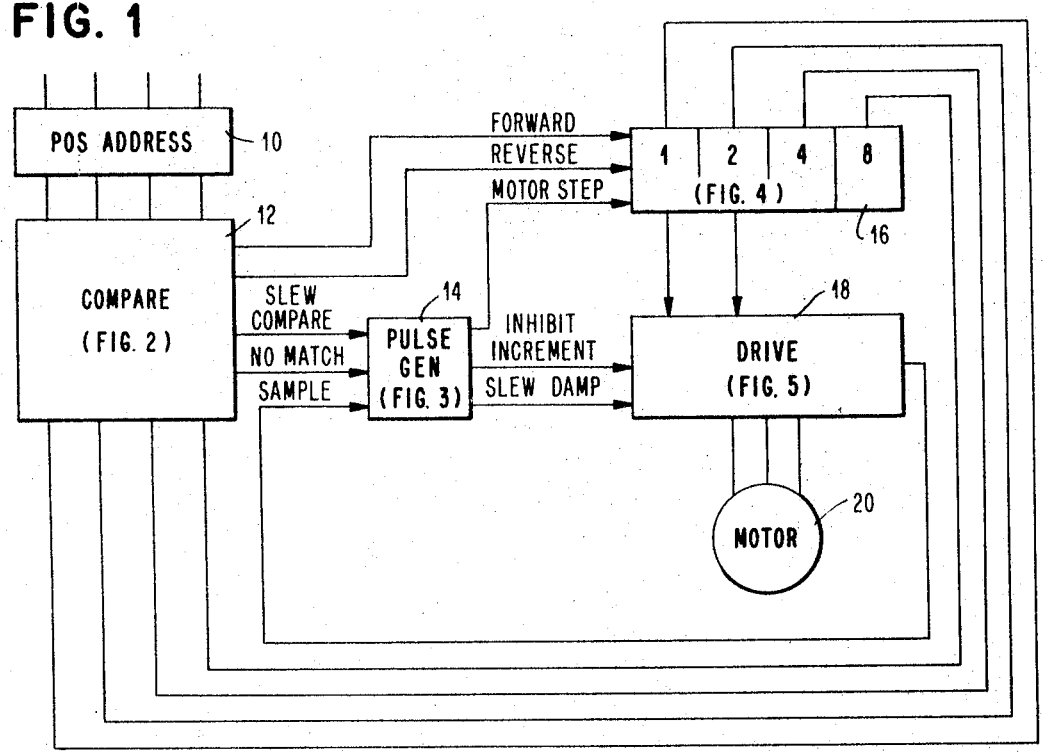

The present invention relates to automatic control systems and more particularly to positioning systems for accurately positioning a movable element in response to input data supplied to the system.

The need for positioning systems exists in many different technologies. In one type of system, it is desired to move an element directly to any of a plurality of positions in response to an input command. It is desirable to move the element to any one of the positions in the shortest possible time but with high precision. A stepping motor may be used to drive the element from one position to another either by incrementally stepping the motor one increment at a time or by running the motor at synchronous speed to "slew" a plurality of increments. Various systems for controlling the starting, incrementing or running, and stopping of stepping motors are disclosed in U.S. Patent No. 3,328,658 entitled, "Systems for Controlling Stepper Motor Operations," by Leon J. Thompson, filed July 2, 1964. In this patent the non-oscillatory operation of a stepper motor is described when the motor is operated either in single step increments or when the motor is brought up to synchronous speed and then stopped. However, it is not shown how to rapidly drive a movable element to a plurality of fixed positions in response to input commands.

It is therefore a paramount object of this invention to provide a positioning system for precisely driving a movable element to one of a plurality of positions in response to an input command.

It is also an object of this invention to provide an improved apparatus for moving a recording transducer to one of a plurality of tracks on a recording medium.

It is a further object of this invention to provide a positioning system utilizing a stepping motor, which system causes the motor to step a plurality of steps without oscillation in a first mode of operation and causes the system to move a single step without oscillation in a second mode of operation.

Briefly, the above objects are accomplished in accordance with the invention by providing a control system which drives a stepping motor in either of two modes. In the first mode, the motor steps one increment on command, and the motion is damped so that no oscillations occur. In the second mode, the motor is stepped a fixed number of increments on command, and the motion is damped so that no oscillations occur at the end of the fixed number of increments.

In accordance with one aspect of the invention, a circuit determines if the new position to which the motor is to be stepped is less than the fixed number. If it is, only single increment motion is commanded. If the new position is greater than or equal to the fixed number, the motor is repetitively energized in the second mode until the actual position of the motor is less than the fixed number. The motor is then stepped in single increments until the motor is at the desired position.

The invention has the advantage that the stepping motor is operated in single step increments when only a few steps must be taken to reach the desired position. When a large number of steps must be taken to reach the position the motor is driven a plurality of steps for each actuation of the control device, thereby spanning several positions until the motor is located near its desired position. The motor is then stepped in single increments until the desired position is reached. In this manner the motor is moved into the vicinity of its desired position quickly.

The foregoing and other objects, features and advantages of the invention will be apparent from the following more particular description of a preferred embodiment of the invention, as illustrated in the accompanying drawings.

Figure 3:
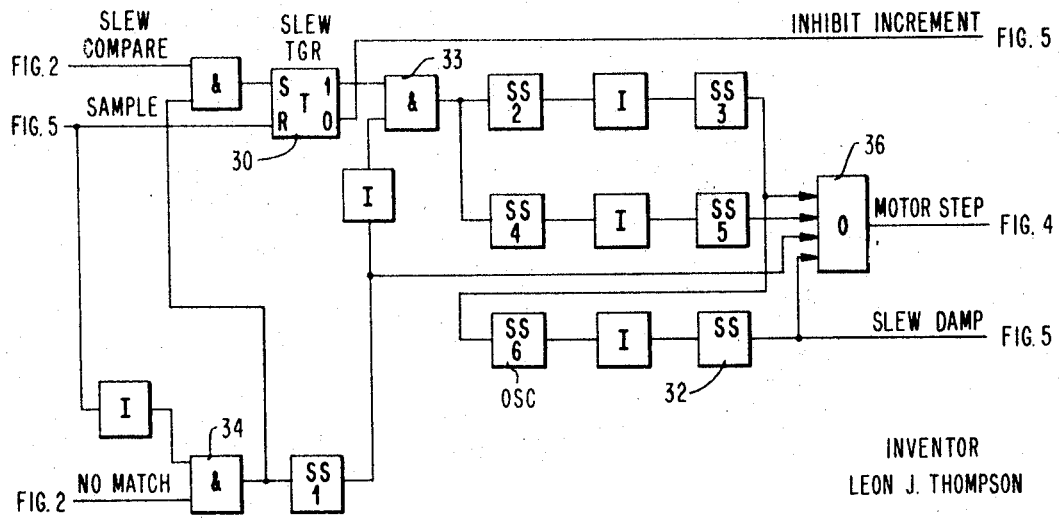
Figure 2:
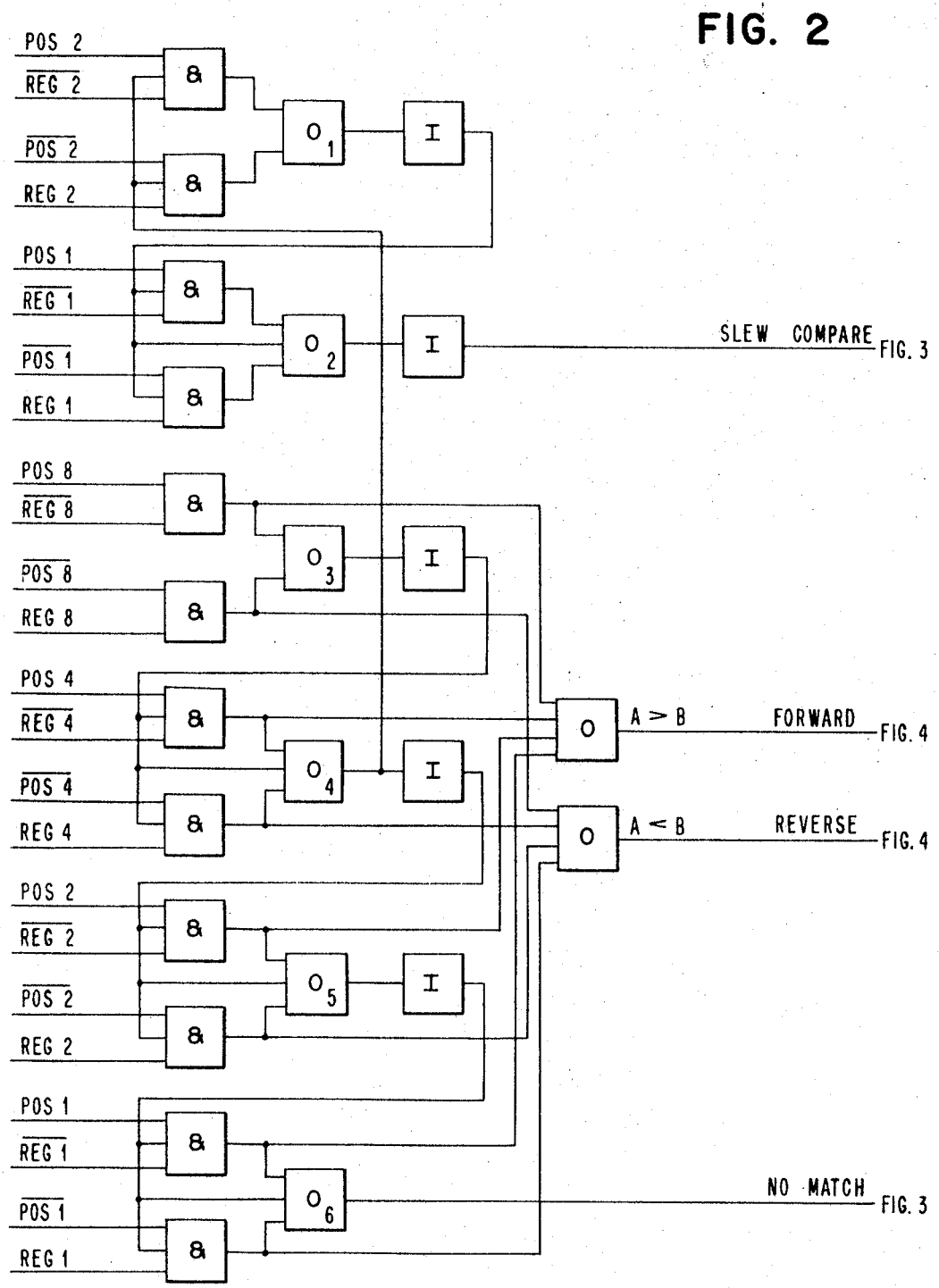
Figure 4:
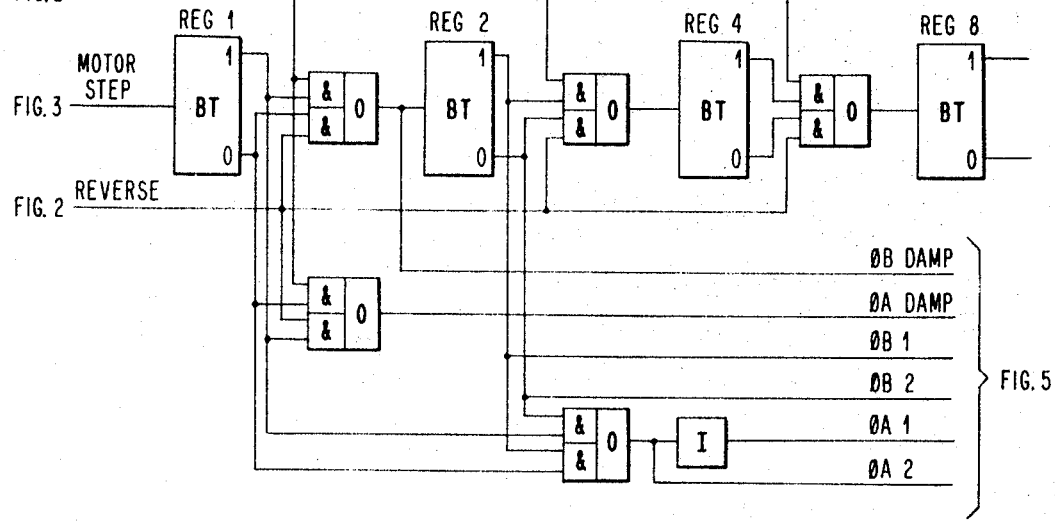
Figure 5:
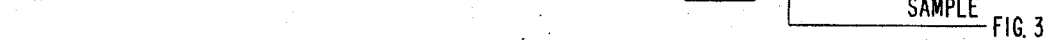
Figure 6:
Figure 6:
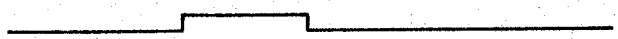
Figure 6:
Figure 6:
Figure 6:
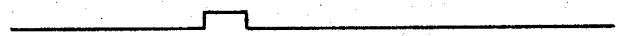
Figure 6:
Figure 6:
Figure 6:
Figure 6:
Figure 6:
Figure 6:
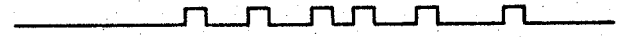
Figure 6:
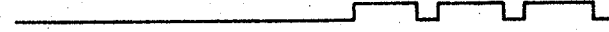
Figure 6:
Figure 6:
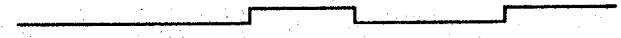
Figure 6:
Figure 6:
Figure 6:
Figure 6:
Figure 6:
Figure 6:
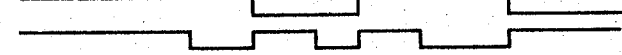
Figure 6:
Figure 6:
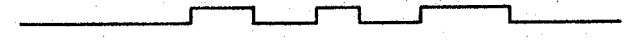
Figure 6:
Figure 6:
Figure 6:
Figure 6:
Figure 6:
Figure 6:
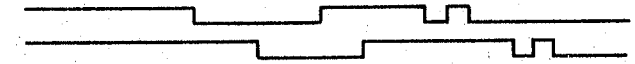
Figure 6:
Figure 6:

In the drawings:
FIGURE 1 is a block diagram of a positioning system embodying the invention;
FIGURE 2 is a logical block diagram of the compare circuit shown in FIGURE 1;
FIGURE 3 is a logical block diagram of the pulse generator circuit shown in FIGURE 1;
FIGURE 4 is a logical block diagram of the reversible counter shown in FIGURE 1;
FIGURE 5 is a logical block diagram of the motor drive circuits shown in FIGURE 1; and
FIGURE 6 is a timing diagram illustrating the operation of the circuits shown in FIGURES 1–5.

Referring now to FIG. 1, the overall system comprises a position register 10 for registering a positional address; a compare circuit 12; a pulse generator 14; a reversible counter 16; drive circuits 18 and a stepper motor 20.

For purposes of illustration, it is assumed that the stepper motor 20 drives a movable recording head to any one of 16 positions across the surface of a magnetic recording medium. The desired position address is stored in digital form in position address register 10. The actual position of the motor is indicated by reversible counter 16. The output of binary stages 1 and 2 of the reversible counter provide energizing pulses to drive circuit 18. The output of drive circuit 18 positions the motor 20 to the position indicated by the reversible counter 16. The actual position of the motor 20 as indicated by the contents of reversible counter 16 is compared with the desired position address indicated by the output of position register 10 in a compare circuit 12. The compare circuit determines whether or not the motor has to be stepped in a forward or a reverse direction in order to step the motor toward the desired address. The compare circuit also generates a "slew compare" output whenever the difference between the actual address (reversible counter 16) and the desired address (position register 10) is greater than a predetermined number. In the embodiment shown, the predetermined number is 4. The compare circuit also generates a "no match" signal whenever the actual position and the desired position addresses do not match. The outputs of the compare circuit 12 are fed to a pulse generator 14 which generates motor step pulses which step the reversible counter 16. The pulse generator also develops certain control signals, "inhibit increment" and "slew damp," which operate to energize the drive circuitry 18 in such a manner that the motor 20 is caused to move in a non-oscillatory manner.

If the position address 10 and the actual address 16 differ by more than 4 the pulse generator 14 generates a series of 4 motor step pulses and energizes the drive circuit 18 such that the motor 20 is driven through four steps in a smooth non-oscillatory manner. If after the end of four steps the difference between the two addresses is still greater than 4, the 4-step slew is repeated. If however the difference is less than 4, the circuitry reverts to a single step mode. In this mode the pulse generator 14 delivers one motor step pulse to the reversible counter 16 along with the proper controls to drive circuit 18 to drive the motor 20 in single non-oscillatory increments. The single steps continue until the "no match" line generated by compare circuit 12 is dropped thus stopping the generation of motor step pulses.

In the incremental mode each step is independent of preceding and succeeding motion. This means that the motor rotor is stable at the time a step command is given. The command causes the rotor to move one step and the rotor becomes stable again before the next step command is given.

In the slewing mode, the motor drive circuitry is given a series of step pulses which cause the rotor to move a plurality of increments, 4 in the embodiment shown. Each step is not independent of the preceding and succeeding motion, however the spacing of the pulses is such that the rotor does not oscillate at the end of the 4-step slew.

The following paragraphs describe the circuitry within the blocks of FIG. 1 in more detail with reference to FIGS. 2–5.

FIG. 2 illustrates the compare circuit. The inputs to the compare circuit of FIG. 2 include the outputs of position address register 10 labeled POS 1, 2, 4, 8 and the inverse of each of these functions; and the outputs of the reversible counter 16 labeled REG 1, 2, 4, 8 and the inverse of these functions. The logic of FIG. 2 operates upon the input data to produce an output on the "forward" line whenever the magnitude of the contents of the position register is greater than the magnitude of the contents of the reversible counter. The logic causes an output on the "reverse" line when the magnitude of the contents of the reversible counter is greater than the magnitude of the contents of the position register. If the difference between the two registers is equal to or greater than 4, an output is generated on the "slew compare" line. As long as the contents of the two registers are unequal, the "no match" line is energized.

FIG. 3 shows the details of pulse generator 14 of FIG. 1. The pulse generator includes a slew trigger 30, single shots 1–6 and slew damp single shot 32. The slew latch conditions the circuitry for either slew mode or increment mode depending upon instructions from the compare circuits of FIG. 2. The single shots provide timing necessary in the generation of motor step pulses.

The details of the reversible counter are shown in FIG. 4. The reversible counter comprises four registers 1, 2, 4 and 8. Energization of the "forward" and "reverse" lines determines count direction. While the "forward" line remains energized, pulses on the "motor step" line cause the register to count from 0 to 15. (If instead the "reverse" line had been energized, the counter would have counted in the reverse direction.) The outputs of the first two stages of the counter are decoded to provide phase information to the motor drive circuitry shown in FIG. 5.

FIG. 5 shows the details of the motor drive circuits 18 of FIG. 1. The single shots 7–10 provide timing pulses generated during single increment mode of operation. Single shot 40 provides a control pulse to the pulse generator of FIG. 3 which keeps the control system in operation until a match between the desired address and the actual address occurs.

The timing diagram of FIG. 6 illustrates voltage levels at various points in the circuitry for a simple positioning operation. It is assumed that initially the recording head is at the zero position as indicated by the location register which initially reads zero. It is further assumed that it is desired to move the recording head to the position address designated 6. Initially the position register 10 is loaded with the binary representation of the decimal digit 6. Because the two addresses do not compare, the "no match" line (FIG. 2) becomes positive. Also the "slew compare" line becomes positive because the difference between the position address (6) and the location register (0) is greater than 4. The output from the "slew compare" line turns on the slew trigger 30 causing the "inhibit increment" line (FIG. 3) to fall. The output of AND circuit 34 energizes single shot 1 which through the OR circuit 36 generates a motor step pulse. Since the slew trigger is on the trailing edge of single shot 1 it fires single shot 2. The trailing edge of single shot 2 fires single shot 3 the output of which passes through the OR 36 to cause the next motor step pulse. Single shot 1 also fires single shot 4, the trailing edge of which fires single shot 5 causing the third motor step pulse. The trailing edge of single shot 3 fires single shot 6, the output of which fires slew damp single shot 32 which causes the fourth motor step pulse. The timing of these four pulses is governed by the timing of the single shots which is adjusted so that the motor steps through four increments without oscillation. This control method causes the motor to move a fixed number of steps (four steps in this embodiment) by generating a specifically timed series of pulses which are transmitted to the motor driving circuits in such a manner as to produce a smooth nonincremental motion for the duration of the fixed number of motor steps. Similar circuits can be constructed to slew for any number of steps. Upon the application of the first motor step pulse to the motor driving circuits, the current in the motor coils driven by D1 and D2 is changed and this causes the motor rotor to accelerate and rotate in the desired direction. When this motion has been established, a second motor step pulse is generated being timed from the leading edge of the first pulse. The second pulse is applied to the motor driving circuit causing a change in the current in motor coils driven by D3 and D4 so as to continue rotation in the same direction and thus reinforce the acceleration in the existing direction. The optimum time of application of this second pulse is when the rotor has rotated approximately one-half of a motor step. The time limits between which this second pulse should be applied are: simultaneously with the first pulse (under which condition the rotor position becomes unstable and would thus lose its directional sense) and that time in which the rotor has rotated one step (at which time the rotor starts to decelerate. The third motor step pulse is generated timed from the leading edge of the first pulse and applied to the motor driving circuits thus causing the first pair D1 and D2 of motor coil currents to change to produce continued rotation. The time of application of the third pulse is such as to cause the rotor to overshoot the third rotor position by one rotor step. Under this condition the angular rotor velocity at the peak of the overshoot is zero and the rotor is at the fourth rotor position. At this time the fourth motor step pulse is generated and applied to the motor circuits again causing a current change in the second pair, D3 and D4, of motor coils. This fourth pulse is applied when the rotor is in the fourth rotor position and when the rotor velocity is zero. This establishes a stable condition, hence no further rotor motion occurs. Thus the desired four-step slew occurs without oscillation.

As illustrated by FIG. 6, at the end of the four step slew the location register contents have been stepped up to 4. The difference between the contents of the position address register 10 and the location register 16 is now 2. The "slew compare" line dropped when the contents read 3 because the difference between the two registers was less than 4. The slew damp single shot output (FIG. 3) passes through OR circuit 39 (FIG. 5), the output of which fires sample single shot 40. The "sample" output resets the slew trigger 30 (FIG. 3). The sample output is inverted and drives one leg of AND circuit 34. The trailing edge of the sample single shot output causes an output from the AND circuit 34 to fire single shot 1. The output of single shot 1 passes through OR circuit 36 to cause a motor step pulse. Since the "slew compare" line in FIG. 3 is negative, the slew trigger remains off and the "inhibit increment" line remains positive. No output occurs from the AND circuit 33 which is now degated by the output of the slew trigger 30. Therefore, the 4-step slew operation described above does not take place and the circuitry operates in the increment mode.

The increment mode of operation is similar to that described in the above identified patent application. The motor step pulse causes the reversible counter to step one position. In response to the stepping of the counter, the motor currents driven by drivers D1 and D2 are switched in phase, and the phase A damp line is switched negative. As shown in FIG. 5, the "inhibit increment" line which is positive allows the phase A and phase B damp signals to pass through AND circuits 50, 52. This causes the output of AND 50 to drop. The output of inverter 51 rises and fires single shot 7. The trailing edge of single shot 7 fires single shot 8. The output of single shot 8 momentarily causes a reversal of currents in drivers D1 and D2 by the action of inverter 54 through the AND-OR logic block combination 56. The timing of the single shots for non-oscillatory incremental stepping is more fully described in the above identified application and need not be repeated here.

The output of single shot 8 also passes through OR 39 to fire single shot 40 which causes another sample pulse. The sample pulse passes through the AND circuit 34 because the "no match" line entering one leg thereof is still positive. The above sequence of generating a motor step pulse and a reversing pulse to the drive circuits is repeated. At the end of the operation another sample pulse is generated by the single shot 40. However the last sample pulse does not pass through AND circuit 34 in FIG. 3 because the "no match" line is driven negative when the position register and the location register both contain the digit 6.

In summary, a digitally controlled positioning system has been shown in which a movable element may be accurately positioned in response to an input command. The apparatus has been designed so that the driving circuitry may operate in one of two modes. In one mode of operation the element is moved over a fixed number of positions until the distance remaining to be moved is less than the fixed number. Circuitry is then operated in a second mode of operation to move the element one position at a time until the element reaches the desired position. The circuitry is designed so that the motion in each mode of operation is optimized; that is the element will move and come to a stop without oscillation.

While the invention has been particularly shown and described with reference to a preferred embodiment thereof, it will be understood by those skilled in the art that various changes in form and detail may be made therein without departing from the spirit and scope of the invention.

What is claimed is:

1. A positioning system comprising:
   a stepping motor;
   first mode operation means for generating a single motor step signal and damping signals, for providing non-oscillatory incremental motion of said motor;
   second mode operation means for generating multiple motor step signals for moving said step motor a fixed number of increments, said step signals timed so that the motor moves said fixed number of increments without oscillation;
   means for generating a sample signal at the end of each mode of operation;
   means for comparing the actual location with a desired location of said stepping motor and for generating a first output when the difference is less than said fixed number and a second output when the difference is greater than said fixed number;
   means responsive to said sample signal and the first output of said comparing means for initiating said first mode of operation; and
   means responsive to said sample signal and the second output of said compare for initiating said second mode of operation.

2. The combination according to claim 1 wherein said comparing means also generates an output signal indicating whether or not the actual and desired locations are the same, and means responsive to said signal for inhibiting said sample signal.

3. In a positioning system in which a movable element is moved from its actual position to a desired position in response to an input command the combination comprising:
   electromotive means capable of being driven in either a forward or a reverse direction in response to input currents supplied thereto;
   means for registering a position address corresponding to the desired address;
   a reversible counter for indicating the actual position address of said electromotive means;
   drive means responsive to outputs of said counter for establishing said input currents;
   compare means responsive to outputs from said registering means and said counter means to generate:
   a no match signal when said addresses do not agree, a forward signal if the actual address is greater than the desired address, a reverse signal if said actual address is less than said desired address, and for generating a slew compare signal when the magnitude of the difference between said addresses is greater than a fixed number;
   a pulse generator responsive to said slew compare signal to generate step signals supplied to the reversible counter to step said counter in a forward or reverse direction depending upon the status of the respective forward and reverse lines from said compare; and
   means in said pulse generator for generating a fixed number of step pulses when said slew compare is energized, the relative time position of said step pulses being such as to cause said electromotive drive means to be driven in a non-oscillatory manner.

4. The combination according to claim 3 including:
   incremental control means responsive to said no match signal for delivering a step signal to said reversible counter, to thereby cause switching of input currents supplied to said electromotive drive means;

reversal means responsive to stepping of said reversible counter for causing a momentary return of said input currents to their initial state prior to switching, to thereby cause deceleration of said electromotive means to substantially zero velocity when the movable element has reached the step position represented by the output of said reversible counter, said reversal means providing for reapplication of the switched currents for causing non-oscillatory holding of said movable element at the step position.

References Cited

UNITED STATES PATENTS

| | | | |
|---|---|---|---|
| 2,979,972 | 4/1961 | Danly | 318—162 XR |
| 3,098,187 | 7/1963 | Sciaky | 318—162 XR |
| 3,105,927 | 10/1963 | Flatten | 318—28 XR |
| 3,172,026 | 3/1965 | Schuman | 318—28 |

B. DOBECK, Primary Examiner

U.S. Cl. X.R.

318—28, 138